June 17, 1941.  W. E. LOBO  2,246,469
HEATING OF FLUIDS
Filed Dec. 29, 1938  2 Sheets-Sheet 1

INVENTOR
WALTER E. LOBO
BY C. J. Liebrecht
ATTORNEY

Patented June 17, 1941

2,246,469

UNITED STATES PATENT OFFICE 2,246,469

HEATING OF FLUIDS

Walter E. Lobo, Westfield, N. J., assignor to Gasoline Products Company, Inc., Jersey City, N. J., a corporation of Delaware Application December 29, 1938, Serial No. 248,189

5 Claims. (Cl. 196—116)

This invention relates to improvements in heating apparatus for heating fluids and methods of heating hydrocarbon fluids, the heating apparatus being especially adapted for heating hydrocarbon fluids to elevated or conversion temperatures.

According to one form of my invention a furnace adapted for heating hydrocarbon fluids to conversion temperatures includes a plurality of separately fired combustion or radiant heating chambers and a common convection heating section receiving hot products of combustion from the combustion chambers. Heater tubes or conduit elements are arranged in the convection section and in the combustion chambers for conducting hydrocarbon fluids through the furnace. The heater tubes in the convection section are preferably provided with welded return bends so that the entire lengths of all the heater tubes are positioned within the convection section and receive heat from the hot combustion gases passing therethrough. Hydrocarbon fluid to be heated is preferably first passed through the heater tubes in the convection section for preheating.

After being preheated by passing through the heater tubes in the convection heating section, the stream of hydrocarbon fluid is passed through the heater tube or conduit arranged in one of the combustion or radiant heating chambers. The heater tube is arranged as a continuous coil within the radiant heating section so that the entire heater tube is positioned within the radiant heating section and is subjected to radiant heat therein. The radiant heating section is preferably rectangular in cross section and the heater tube is generally rectangular in shape and the turns thereof are arranged adjacent the roof and floor and side walls, respectively, of the radiant heating section. The heated hydrocarbon fluid is then passed through a helical rectangular heater tube in the other radiant heating section.

In one form of the heater coil the stream of hydrocarbon fluid is passed through a certain number of turns of the coil and is then passed through a smaller coil similar in shape to the first described coil and which is positioned or arranged within another coil of substantially the same shape and size as the first described coil. The coil sections or turns of the smaller and larger coils are staggered. The heater tube including the large and smaller coils is arranged in one radiant heating section as a continuous heater tube. After passing through the smaller coil, the stream of hydrocarbon fluid is passed through the last mentioned larger coil for the last part of the heating cycle in the one radiant heating section and then leaves the first mentioned radiant heating chamber. The coils are preferably made by bending relatively long lengths of tubing to the desired shapes and then welding the lengths together to form a continuous coil.

From the heater coil in the first mentioned radiant heating section, the stream of hydrocarbon fluid which has become heated in the first radiant heating section is passed through another continuous heater tube of general rectangular shape arranged in a second radiant heating section. The heated hydrocarbon fluid stream may be passed through one coil or through an inner coil and then through a larger outer coil which surrounds the smaller inner coil wherein the hydrocarbon fluid is maintained at a conversion temperature for the desired time.

The separate sections of the coils in the second radiant heating or combustion chamber are preferably arranged in staggered relation and may be spaced closer together than the turns of the coils in the first mentioned radiant heating chamber so as to regulate the amount of heat being supplied to the heater coil. After being heated in the second radiant heating chamber, the stream of converted hydrocarbon products may be passed to any suitable apparatus for the separation of desired products from liquid residue.

In another form of the invention a furnace includes a plurality of radiant heating chambers and a common convection heating section for receiving hot products of combustion from the radiant heating chambers. In this form separate streams of hydrocarbon fluid may be heated. The heater tubes in the radiant heating sections are also in the form of continuous coils having turns or section adjacent the roof and floor and side walls, respectively, of the furnace.

In the convection section of this form of the invention the banks of tubes are preferably connected by headers whereby a hydrocarbon fluid to be heated may be split into a plurality of streams through the convection heating section and then passed as parallel streams through coils having parallel turns in one of the radiant heating chambers. After being heated in this manner the parallel streams may be combined after they leave the radiant heating chamber and may be further treated as desired.

The other radiant heating section is provided with a helical heater tube comprising one or more continuous coils for heating a separate stream of hydrocarbon fluid.

By using heater tubes as continuous coils in the radiant heating sections, it is possible to have the entire heater tube within the radiant heating section and all parts of the heater tube are subjected to radiant heat therein. No return headers and no header boxes are necessary. No end tube sheets other than those required for tube supports are necessary. According to my invention, as the hydrocarbon fluid to be heated to conversion temperature is passed through the continuous coil, it will be seen that the stream of hydrocarbon fluid passes horizontally near the roof of the furnace, then vertically through a turn or section of the coil located or arranged adjacent a side wall, then horizontally through a turn or section of the coil adjacent the floor of the radiant heating section and then vertically through another turn arranged adjacent the other side wall of the radiant heating section. The flow continues in this general path through the radiant heating sections. From this it will be apparent that the stream of hydrocarbon fluid in each radiant heating section is uniformly heated and all of the hydrocarbon fluid is subjected to substantially the same heating conditions.

While down firing is preferred, the burners may be arranged differently to provide other firing for heaters constructed to embody my invention. In some instances the radiant heating sections may be arranged vertically so that the helical coils have vertical axes and down firing or other firing may be used. Where a plurality of radiant heating sections is used, a common convection heating section is preferably used. One or more coils may be used in each radiant heating section, all such coils being continuous and arranged within the radiant heating sections.

A method of heating hydrocarbons according to my invention includes passing hydrocarbon fluid through a heating apparatus having a plurality of separately fired radiant heating sections and a common convection heating section, the hydrocarbon fluid being passed first through the convection heating section as a single stream or plural streams and then through a continuous coil or coils in one radiant heating section and then through another continuous coil or coils in the other radiant heating section. Or separate streams may be heated by being passed through a continuous coil or coils in the separate radiant heating sections. Or the preheated stream or streams may be passed as a single stream or a plurality of streams in parallel flow through the radiant heating section or sections.

In the drawings I have diagrammatically shown two forms of heating apparatus which may be used in carrying out or practicing my invention, but it is to be understood that I am not to be restricted thereto and that other forms of apparatus may be used.

Figure 1:
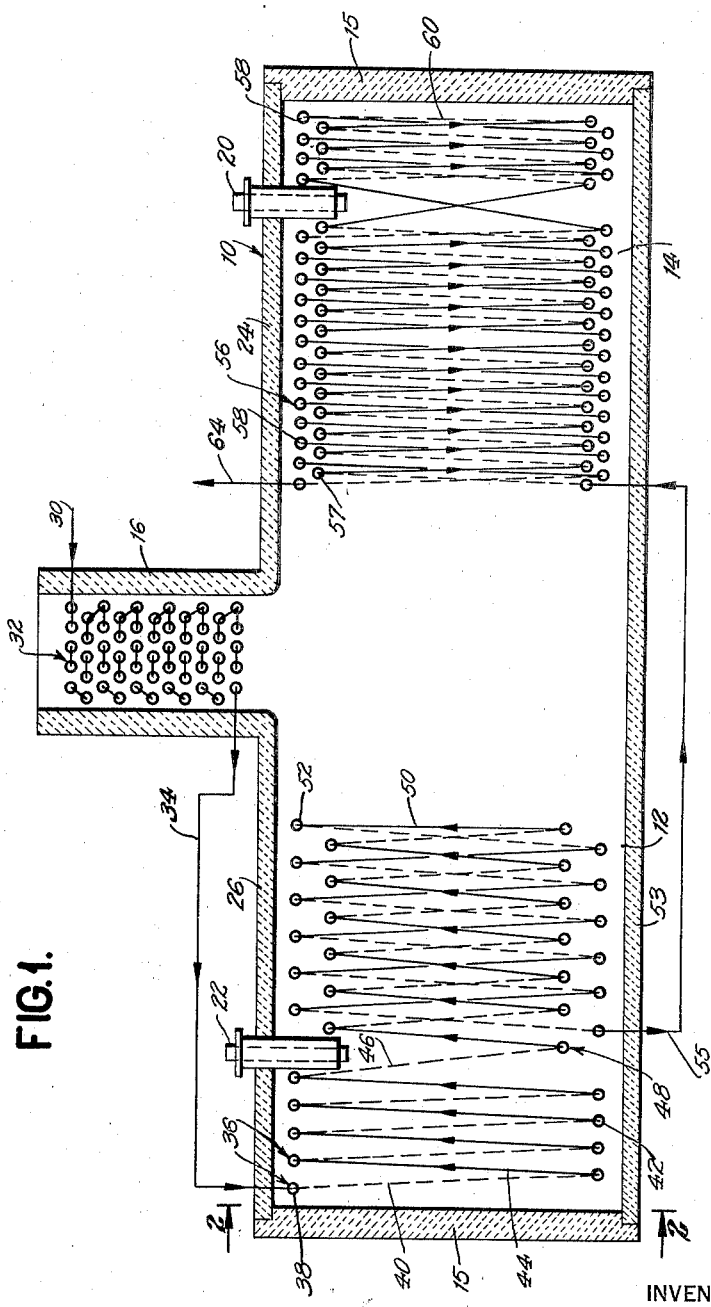
Fig. 1 represents a longitudinal, vertical cross section taken through one form of a heating apparatus containing continuous heating coils.

Referring now to the drawings, the reference character 10 designates a heating apparatus provided with a plurality of separately fired radiant heating sections 12 and 14 which communicate at one end of each heating section. The other ends of the radiant heating sections 12 and 14 are closed as at 15. A common overhead convection section 16 is provided above the communicating ends of the radiant heating sections for conducting the hot products of combustion from the radiant heating sections to the stack. Separate means for heating the radiant heating sections such as burners 20 and 22 are provided for supplying hot products of combustion to the heating apparatus. One or more burners may be used for each section.

The burners 20 are preferably mounted in the roof 24 of the one radiant heating section 14 near the closed end 15 thereof so as to provide down-firing for this radiant heating section. The other burners 22 are also preferably mounted in the roof 26 of the other radiant heating section 12 near the closed end 15 thereof to provide downfiring for supplying hot products of combustion thereto. With downfiring the direction of the burning gases is opposite to the natural draft and in this way more turbulence and better heating is obtained. The burners are preferably arranged near the ends of the radiant heating sections distant from the common convection heating section but other positions may be used. While downfiring is preferred, other forms of heating may be used such as side firing or end firing.

Heater tubes are provided in the convection heating section 16 and the tubes are preferably joined by welded return bends so that all the portions of the heater tubes are positioned within the convection heating section to receive heat from the hot products of combustion passing therethrough. Hydrocarbon fluid to be heated in the furnace is passed through line 30 and through the heater tubes 32 in the convection heating section 16. The hydrocarbon fluid becomes preheated in passing through the heater tubes 32 and is then passed through line 34 and introduced into a heater tube arranged in the radiant heating section 12.

Figure 2:
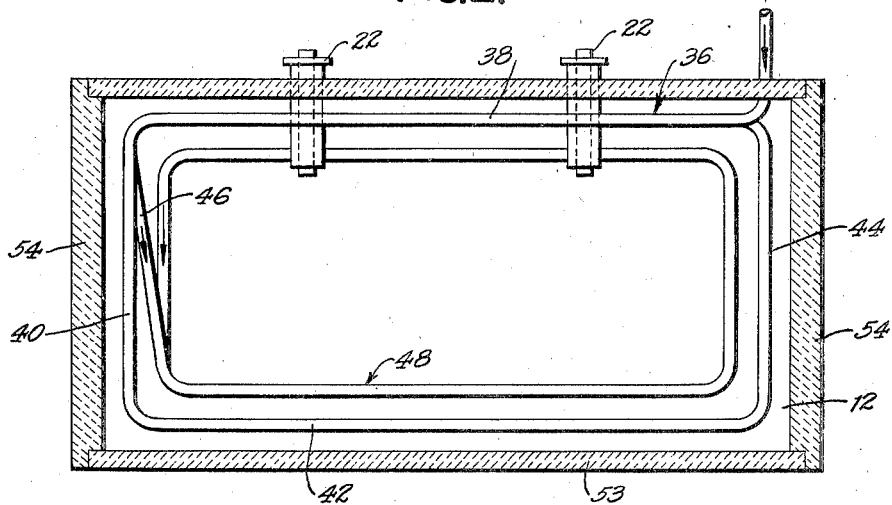
Fig. 2 represents a vertical, transverse cross section taken substantially on line 2—2 of Fig. 1.

The heater tube is generally designated as 36 and is in the form of a continuous helical coil generally rectangular in shape which is entirely within the radiant heating section 12. The radiant heating section 12 is substantially rectangular in cross section and the heater tube is arranged to have its turns or coil sections adjacent the roof and floor and side walls, respectively, of the radiant heating section 12. Attention is directed to Fig. 2 which shows the rectangular shape of the radiant heating section and heater coil 36. The heater tube is preferably made by bending long lengths of tubing into the coil shape arranged to fit within the radiant heating section 12 and then the bent lengths of tubing are welded to form a continuous coil. The continuous coil may be made by welding tube lengths which are half coil sections or turns. The hydrocarbon fluid to be heated in this form of the invention preferably enters the coil 36 adjacent the closed end 15 of the radiant heating section 12 furthest away from the common overhead convection section 16.

The stream of hydrocarbon fluid in passing through the heater tube is first passed through the horizontal portion 38 of the coil 36 adjacent the roof of the radiant heating section 12. It is then passed through the vertically arranged portion 40 near the side wall of the radiant heating section 12 and then passed through horizontal section 42 adjacent the floor of the radiant heating section 12. The hydrocarbon fluid is then passed through the vertically arranged portion 44 arranged adjacent the other side wall of the radiant heating section 12. An inspection of Fig. 1 will show that the portions 40 and 44 of the coil adjacent the side walls are arranged at angles to the vertical in order to form a coil. The rest of the vertically arranged portions adjacent the side walls of the radiant heating section are also arranged at angles as shown in Fig. 1 in order to provide a continuous coil.

After passing through a certain number of turns of the first part of the heater coil 36, the stream of hydrocarbon fluid is passed through the rest of the heater coil or tube 36 comprising a coil within a coil as will be now described. The hydrocarbon fluid is passed through line 46 and through a smaller coil 48 which is of substantially the same rectangular shape as the first mentioned coil 36 but which is of smaller dimensions (see Fig. 2). After passing through this smaller coil 48, the hydrocarbon fluid passes through line 50 and through a larger coil 52 which surrounds the smaller heating coil 48. The smaller coil 48 has coil sections or turns which are parallel to corresponding coil sections or turns of the larger coil 52.

The larger coil 52 is generally rectangular in shape and is of substantially the same size as the first portion of the heater coil 36 hereinbefore described. The larger coil 52 is arranged between the smaller coil 48 and roof 26, floor 53 and side walls 54 of the radiant heating section 12. The smaller heating coil 48 is preferably arranged in staggered relation with the larger heating coil 52 so that both coils are subjected to direct radiant heat generated in the radiant heating section 12 by the hot products of combustion. If desired, smaller heating coil 48 may be omitted and the larger heating coil 52 extended to near or below the common convection heating section 16. The coil sections or turns of the heater coil 36 are spaced to permit introduction of the burners 22. The burners extend below the upper horizontal sections of the heater coil 36 so that flames do not impinge on the heater coil. Or the smaller heating coil 48 may be extended toward the closed end 15 of the radiant heating section 12 to be of substantially the same length as the larger heating coil in the radiant heating section 12. Other forms of burners may be used. For example, fuel to be burned may be introduced behind the roof tubes in each radiant heating section so that the tubes subdivide the fuel into streams which are then ignited and in this way there would be no flame impingement on the tubes.

The coils 48 and 52 are arranged between the burners 22 and the convection section 16. The flow in coil 48 is in a direction from left to right as viewed in Fig. 1 of the drawings so that the hydrocarbon fluid is rapidly heated in passing through a portion of the heater tube arranged in a relatively hot part of the radiant heating section 12. If desired, the flow may be from right to left in coil 48 in Fig. 1 so that the oil is heated more rapidly at the beginning of the heating cycle. The flow of the hydrocarbon fluid in larger coil 52 is in a direction from right to left as viewed in Fig. 1 of the drawings. The coils 48 and 52 may be placed at the left hand side of radiant heating section 12 adjacent closed end 15. Where only one coil is used in radiant heating section 12, the hydrocarbon fluid may be introduced near the closed end 15 of the radiant heating section 12 or near the convection section 16 and the flow may be from left to right or right to left as viewed in Fig. 1.

After passing through the heating coil 52, the hydrocarbon fluid is substantially at a conversion temperature and it leaves the radiant heating section 12 intermediate the ends thereof through line 55 and is passed through a continuous coil heater arranged in the other separately fired radiant heating section 14. In this radiant heating section 14, substantially rectangular heating coils arranged one within the other are provided and are preferably arranged in staggered relation. The hydrocarbon fluid in passing through these coils is maintained at a conversion temperature in order to effect the desired extent of conversion. The radiant heating section 14 functions as a soaking section. The turns or sections of each coil are preferably arranged closer together than the coil sections of the heating coils shown in radiant heating section 12 in order to provide desired heating of the hydrocarbon fluid passing through the coils in the radiant heating section 14.

The hydrocarbon fluid leaving the first radiant heating section 12 through line 55 is passed through a continuous coil-shaped heater conduit 56 in the other radiant heating section 14. The heater conduit comprises a smaller continuous heating coil 57 which is arranged within a larger continuous heating coil 58. The coils 57 and 58 are of substantially the same length. The larger coil 58 is arranged between the smaller coil 57 and the boundary walls of the radiant heating section 14. The hydrocarbon fluid passes through smaller coil 57 in a direction from left to right as viewed in Fig. 1 of the drawings. After passing through the smaller heating coil 57, the hydrocarbon fluid is passed through line 60 forming part of the coil-shaped conduit 56 and through the larger heating coil 58 for further heating. In passing through the larger coil 58, the hydrocarbon fluid is passed in a direction from right to left as viewed in Fig. 1 of the drawings.

After passing through the entire coil 58, the hydrocarbon fluid leaves the second radiant heating section 14 through line 64 and may be passed to apparatus for the separation of the desired products. The radiant heating section 14 is generally rectangular in cross section and the continuous heating coils 57 and 58 of the heater tube 56 are generally rectangular in shape. The heating coils 57 and 58 have their coil sections in staggered relation. The coil sections or turns of heating coils 57 and 58 are spaced to permit introduction of burners 20 which extend below the upper horizontal coil sections of coils 57 and 58 to prevent flame impingement thereon. In some instances the inner heating coil 57 may be omitted. Where coil 57 is omitted, it may be advisable to add coil sections to the larger heating coil 58 in the radiant heating section 14. The spacing of the heater coil sections of the heater coils in the radiant heating sections may be varied as desired to control the heating of the hydrocarbon fluid streams passing through the heater coils. While the helical heater tubes 36 and 56 have been shown spaced apart to leave a space beneath the convection section 16 in Fig. 1 of the drawings, it is to be understood that the heater tubes 36 and 56 may be lengthened to extend under the convection section 16.

The hydrocarbon fluid preheated in the convection heating section may be passed through one coil in one radiant heating section as a single stream and then subdivided in plural streams and passed through parallel coils in the other radiant heating section. One or more coils arranged one within the other may be used in the radiant heating sections. Or one coil only may be used in one radiant heating section and a plurality of coils in the other radiant heating section.

Figure 3:
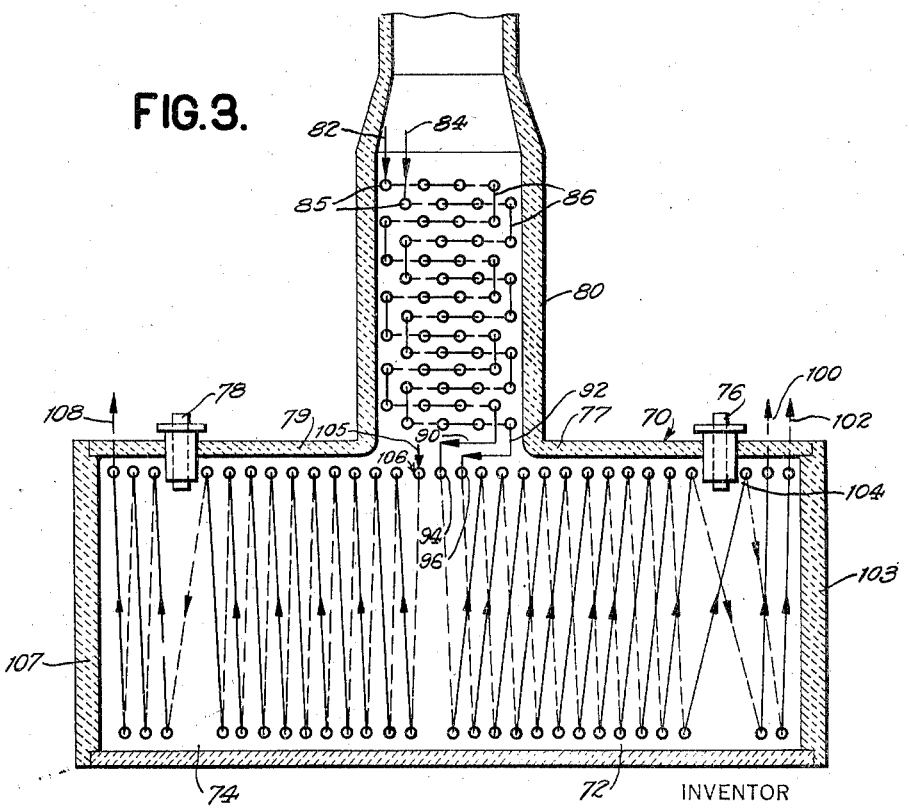
Fig. 3 represents a longitudinal, vertical cross section of another form of heating apparatus containing continuous heating coils.

In Fig. 3 I have shown another form of heating apparatus wherein a plurality of streams of hydrocarbon fluid may be heated in separate radiant heating sections of a heating apparatus. A furnace 70, generally of the same shape as that shown in Fig. 1, is provided with separate radiant heating sections 72 and 74 which may be separately fired. Radiant heating section 72 is preferably heated by downfiring by means of burners 76 which extend through the roof 77 of radiant heating section 72 for supplying hot products of combustion thereto. Radiant heating section 74 is preferably downfired and is provided with burners 78 which extend through the roof 79 of the radiant heating section for supplying hot products of combustion thereto.

The hot products of combustion from the radiant heating sections 72 and 74 pass through a common convection heating section 80. The convection heating section is preferably arranged overhead to receive the combustion products from the communicating ends of the radiant heating sections 72 and 74. Hydrocarbon fluid may be preheated as a single stream but it is preferably passed through lines 82 and 84 as separate streams through the heater tubes 85 in the convection heating section 80 where the hydrocarbon fluid is preheated. In this form of my invention I have provided headers 86 which provide for parallel flow of the separate streams. The return bends may be welded to the heater tubes in the convection heating section 80 so that they are positioned entirely in this section. Other arrangements of heater tubes may be used in the convection heating section 80, as, for example, the convection section may be divided into parallel halves in order to have parallel flow with two streams throughout the convection section.

The separately heated streams are passed in parallel flow through lines 90 and 92, respectively, after being preheated in the convection heating section 80 and each stream is then passed in parallel flow through a separate heating coil arranged in the radiant heating section 72. The stream of hydrocarbon fluid from line 90 is passed through continuous helical rectangular coil 94 and the other stream of hydrocarbon fluid from line 92 is passed through a continuous coil 96 similar to coil 94.

These continuous coils 94 and 96 are generally of the same shape as the coils described in the form of my invention shown in Fig. 1 and provide for parallel flow of the hydrocarbon fluid streams to be heated. Each coil has a horizontal portion adjacent the roof of the radiant heating section, a portion arranged adjacent the floor of the radiant heating section and side portions arranged adjacent the side walls of the radiant heating section. In this way the streams of oil or hydrocarbon fluid pass in paths extending around the walls of the radiant heating section. After being sufficiently heated, the hydrocarbon fluids leave the coils 94 and 96 in the radiant heating section 72 through lines 100 and 102 and may be further heated or they may be introduced into suitable apparatus for the desired separation of products.

It is to be noted that coils 94 and 96 extend from points below about the center of the convection heating section to the closed end 103 of the radiant heating section 72 and the flow of hydrocarbon fluid is toward closed end 103. The burners 76 are positioned near the closed end 103 of the radiant heating section 72 and provide means for downfiring for section 72. The coils 94 and 96 are formed to have their coil sections spaced apart at 104 to permit introduction of the burners 76. A coil or coils may be arranged within coils 94 and 96, if desired. Instead of passing the hydrocarbon fluid through parallel coils 94 and 96, it may be passed through a single coil or double coil as a single stream.

Another stream of hydrocarbon fluid is passed through line 105 and then through a continuous rectangular coil 106 arranged in the other radiant heating section 74 of the heating apparatus. The coil 106 is similar in form to the heater coils above described in order to provide a continuous path around the vertical walls, roof and floor of the radiant heating section 74 whereby the hydrocarbon fluid passing therethrough is uniformly heated. The coil 106 extends from a position near coil 94 beneath the convection heating section 80 to the closed end 107 of the radiant heating section 74. The hydrocarbon fluid is introduced into coil 106 adjacent the convection heating section 80 and passes toward closed end 107 of the radiant heating section 74 or in a direction from right to left as shown in Fig. 3 of the drawings.

After passing through the continuous coil 106, the heated hydrocarbon fluid leaves the radiant heating section 74 through line 108 and may be further treated as desired. The coil sections of the coil 106 adjacent closed end 107 of the furnace are spaced apart to permit insertion of the burners 78. A coil or coils may be arranged within the coil 106, if desired. Coils 94, 96 and 106 may be so arranged to leave a space beneath the convection heating section and between the communicating ends of the radiant heating sections 72 and 74 similar to that shown in Fig. 1.

My invention also contemplates the use of one radiant heating section preferably provided with an overhead convection heating section receiving the hot products of combustion from the radiant heating section. Preheater tubes are provided in the convection heating section. The radiant heating section is preferably downfired and is provided with a rectangular helical continuous coil or coils having coil sections or turns adjacent the boundary surfaces of the furnace so that all of the hydrocarbon fluid passing through the coil or coils is substantially uniformly heated. The same convection heating section may be used or another convection heating section may be provided beyond the first convection heating section for use as a soaking section for supplying further heat to the hydrocarbon fluid.

By arranging the heater coils according to my invention there are heater tubes or tube sections on all walls of the furnace except the two end walls and the entire heater coil is within the furnace where it is exposed to direct radiant heat.

When using continuous heating coils as above described, the coils are decoked without disassembling the coils and are preferably decoked with steam and air. Variations of this method may be used.

While I have shown the coils in the radiant heating sections as having their coil turns or sections in staggered relation, it is to be understood that I am not to be limited thereto as in some cases the coils may be so arranged to have their coil turns or sections immediately one behind the other. With the coil sections or turns of the coils immediately one behind the other or "square" spacing, somewhat better heat distribution to the second or shielded row is obtained than where the coil sections or turns are in staggered relation or "triangular" spacing.

While I have disclosed several forms of my invention it is to be understood that these are by way of example only and variations and changes may be made without departing from the spirit of my invention.

I claim:

1. An apparatus adapted for heating hydrocarbon fluids which includes a plurality of separately fired horizontal radiant heating sections substantially rectangular in cross section, a common overhead convection heating section receiving hot products of combustion from said radiant heating sections, heater tubes in said convection heating section for preheating hydrocarbon fluid, means whereby hot products of combustion are introduced into said radiant heating sections from the top thereof, and a continuous helical conduit shaped so as to be received entirely within each radiant heating section and adapted to receive direct radiant heat from the hot products of combustion, said heater tubes and one of said continuous helical conduits being in communication whereby preheated hydrocarbon fluid from said heater tubes is further heated by being passed through said conduit, means whereby a separate stream of hydrocarbon fluid is passed through said other conduit, said conduits having coil sections or turns adjacent the roofs, floors and vertical walls, respectively, of said radiant heating sections whereby the streams of hydrocarbon fluid are substantially uniformly heated in passing through said conduits, one of said conduits comprising parallel coils to provide parallel flow of the hydrocarbon fluid passing therethrough.

2. An apparatus adapted for heating hydrocarbon fluids which includes a plurality of horizontal, separately fired radiant heating sections substantially rectangular in cross section, a common overhead convection heating section receiving hot products of combustion from said radiant heating sections, heater tubes in said convection heating section for preheating hydrocarbon fluid, means whereby hot products of combustion are introduced into said radiant heating sections, a continuous rectangular coil-shaped heating conduit entirely within each radiant heating section and adapted to receive direct radiant heat from the hot products of combustion, one of said conduits comprising a coil within a portion of another coil, the coils having their coil turns or sections in staggered relation, said heater tubes and conduits being in communication whereby preheated hydrocarbon fluid from said heater tubes is further heated by being passed through said conduits in succession, said conduits having coil sections or turns arranged in parallel relation to the roofs, floors and vertical walls, respectively, of said radiant heating sections whereby the hydrocarbon fluid is substantially uniformly heated in passing through said conduits, said coil sections or turns in said second radiant heating section being arranged closer together than the coil sections or turns in said first radiant heating section to provide a soaking section.

3. An apparatus adapted for heating hydrocarbon fluids which includes a plurality of separately fired radiant heating sections substantially rectangular in cross section, a common overhead convection heating section receiving hot products of combustion from said radiant heating sections, heater tubes in said convection heating section for preheating hydrocarbon fluid, means whereby hot products of combustion are introduced into said radiant heating sections, continuous helical conduits of general rectangular form arranged horizontally entirely within said radiant heating sections and adapted to receive direct radiant heat from the hot products of combustion, said conduits in each radiant section comprising a coil within a coil, said heater tubes and continuous helical conduits being in communication whereby preheated hydrocarbon fluid from said heater tubes is further heated by being passed first through said coils in one radiant heating section and then through said coils in said other radiant heating section, said continuous helical conduits having coil sections or turns arranged in parallel relation to the boundary surfaces of said radiant heating sections whereby the hydrocarbon fluid is substantially uniformly heated in passing through said helical conduits.

4. A method of heating hydrocarbon fluids in a heating apparatus comprising a plurality of separately fired radiant heating sections substantially rectangular in cross section and a common convection heating section for receiving hot products of combustion from said radiant heating sections, which comprises passing a stream of hydrocarbon fluid through said common convection heating section for preheating the hydrocarbon fluid, passing the stream of preheated hydrocarbon fluid through a continuous helical heating conduit of substantially rectangular shape and arranged in one of said radiant heating sections, said conduit having coil sections substantially parallel to and adjacent the roof, floor and vertical walls, respectively, of the radiant heating section in which it is located, introducing hot products of combustion into said radiant heating section for supplying heat to the hydrocarbon fluid passing therethrough, then passing the hydrocarbon fluid through a second continuous helical heating conduit of substantially rectangular shape and arranged entirely within said other radiant heating section, said second conduit comprising coils one within the other, the coils having their coil turns or sections staggered, said coils having their coil turns substantially parallel to and adjacent the roof, floor and vertical walls of said second mentioned radiant heating section, respectively, the hydrocarbon fluid passing through the inner coil and then the outer coil, and supplying hot products of combustion to said second mentioned radiant heating section for supplying further heat to the hydrocarbon fluid passing through said second conduit.

5. A method of heating hydrocarbon fluids in a heating apparatus comprising a plurality of separately fired radiant heating sections substantially rectangular in cross section and a common convection heating section for receiving hot products of combustion from said radiant heating sections, which comprises passing a stream of hydrocarbon fluid through said common convection heating section for preheating the hydrocarbon fluid, then passing the preheated stream of hydrocarbon fluid through a coil-shaped continuous conduit arranged in one of said radiant heating sections and comprising a coil within a coil, said conduit having coil sections substantially parallel to and adjacent the roof, floor and vertical walls, respectively, of said radiant heating section in which it is located so that the hydrocarbon fluid follows a helical path, introducing hot products of combustion into said first mentioned radiant heating section for supplying heat to the hydrocarbon fluid, then passing the hydrocarbon fluid through a second continuous coil-shaped continuous conduit in said other radiant heating section, said conduit comprising a coil within a coil and having coil sections substantially parallel to and adjacent the roof, floor and vertical walls, respectively, of said second mentioned radiant heating section, supplying hot products of combustion to said second mentioned radiant heating section for supplying further heat to the hydrocarbon fluid passing through said second mentioned conduit.

WALTER E. LOBO.